United States Patent [19]

Wyman et al.

[11] 3,959,869

[45] June 1, 1976

[54] APPARATUS FOR THE REMOTE GROUNDING, CONNECTION AND DISCONNECTION OF HIGH VOLTAGE ELECTRICAL CIRCUITS

[75] Inventors: Carl W. Wyman, Flanders; Charles E. Andersen, Independence Township, both of N.J.

[73] Assignee: Amerace Corporation, New York, N.Y.

[22] Filed: Mar. 29, 1974

[21] Appl. No.: 456,428

[52] U.S. Cl.............................. 29/203 H; 29/240; 81/53.1; 81/112
[51] Int. Cl.².......................................... H01R 43/00
[58] Field of Search ...... 29/203 H, 203 HM, 203 R, 29/200 H, 200 D, 240; 339/92 R, 59 R, 60 R, 61 R; 81/53.1, 112–115

[56] References Cited
UNITED STATES PATENTS

| 391,532 | 10/1888 | Hoffman | 81/112 |
|---|---|---|---|
| 2,599,026 | 6/1952 | Strayer | 81/112 |
| 2,753,746 | 7/1956 | Cummings | 81/112 |
| 3,098,289 | 7/1963 | Demler | 29/203 H |
| 3,136,040 | 6/1974 | Bauer et al. | 29/203 H |
| 3,606,660 | 9/1971 | Davis | 29/203 R |
| 3,861,777 | 1/1975 | Clark | 339/92 R |

*Primary Examiner*—Carl E. Hall
*Attorney, Agent, or Firm*—S. Michael Bender

[57] ABSTRACT

Apparatus which enables grounding, connection and disconnection of high voltage electrical connectors from a safely remote location includes a grounding device for making a ground connection to the conductor of a high voltage cable through the contact of the connector itself and a coupling device for selectively coupling the grounding device to an insulated tool, such as a hot-stick, for installation and removal of the grounding device and the grounded electrical connector with the insulated tool.

24 Claims, 6 Drawing Figures

APPARATUS FOR THE REMOTE GROUNDING, CONNECTION AND DISCONNECTION OF HIGH VOLTAGE ELECTRICAL CIRCUITS

The present invention relates generally to apparatus for assisting in the grounding of circuit elements in de-energized high voltage power distribution circuits and in the connection and disconnection of high voltage electrical connectors to and from terminals of high voltage electrical apparatus in such circuits and pertains, more specifically, to apparatus which enables the grounding of the circuits served by such connectors and the manipulation of the connectors from a remote location to promote the safety of workmen who maintain such installations and make the connections and disconnections.

The increasingly widespread use of underground power distribution systems has led to the development of larger systems utilizing components designed to handle greater amounts of power. Electrical connectors developed for use in such systems have been designed to accommodate approximately 15 to 35 kV. Along with the development of such components there has arisen the need for apparatus which will enable installation and maintenance of the various components of the system with safety. Thus, it has become common practice to manipulate such components, as, for example, in the connection and disconnection of electrical connectors to and from the terminals of high voltage electrical apparatus, from a remote location which places the workman at a safe distance from the connection. An insulated tool, known as a "hot-stick", has come into almost universal use by workmen who install and service high voltage power distribution systems for manipulating the various components in making connections and disconnections in the systems.

It is therefore an object of the invention to provide apparatus which facilitates the connection and disconnection of high voltage electrical connectors to and from terminals of high voltage electrical apparatus utilizing an insulated tool, such as a hot-stick, so as to place a workman at a safely remote location during such operations.

Another object of the invention is to provide apparatus for establishing a visible ground connection to circuit elements of a de-energized high voltage power distribution circuit, through the use of a hot-stick, at an electrical connector for purposes of servicing the circuit with safety.

Still another object of the invention is to provide apparatus which enables a hot-stick to be employed in providing a ground connection to the contact of a high voltage electrical connector and for the effective connection and disconnection of the electrical connector to and from the terminal of an electrical apparatus.

A further object of the invention is to provide apparatus which combines the dual functions of grounding the contact of a high voltage electrical connector and disconnecting the connector from a complementary terminal of a high voltage electrical apparatus.

A still further object of the invention is to provide simplified apparatus for attachment to a hot-stick to enable manipulation of high voltage electrical connectors and components thereof from a remote location.

The above objects, as well as further objects and advantages, are attained by the invention which may be described briefly as apparatus for enabling grounding of a high voltage distribution circuit, through circuit elements located at the junction of an electrical connector and the terminal of an electrical apparatus, from a remote location by the use of an insulated tool, such as a hot-stick, the circuit elements including a contact in the connector affixed to the central conductor of a high voltage cable, and a conductor in the terminal, the contact connecting the central conductor to the conductor of the terminal, the apparatus comprising a housing, a longitudinally extending shaft journaled for rotation in the housing, the shaft having opposite ends, engaging means at one end of the shaft for engaging a circuit element in response to rotation of the shaft, conductive grounding means, means in the housing for electrically connecting the grounding means to the circuit element when the shaft is engaged with that circuit element, and rotation means at the opposite end of the shaft for coupling the shaft for rotation with the insulated tool. The engaging means can include a thread on the shaft for engaging a complementary threaded hole in the conductor of the terminal for merely grounding the circuit elements or a thread on the shaft for engaging a complementary threaded aperture in the contact for effecting connection or disconnection of the electrical connector and the terminal.

The invention will be more fully understood, while still further objects and advantages will become apparent, by reference to the following detailed description of embodiments of the invention illustrated in the accompanying drawing, in which.

Figures 1, 2:
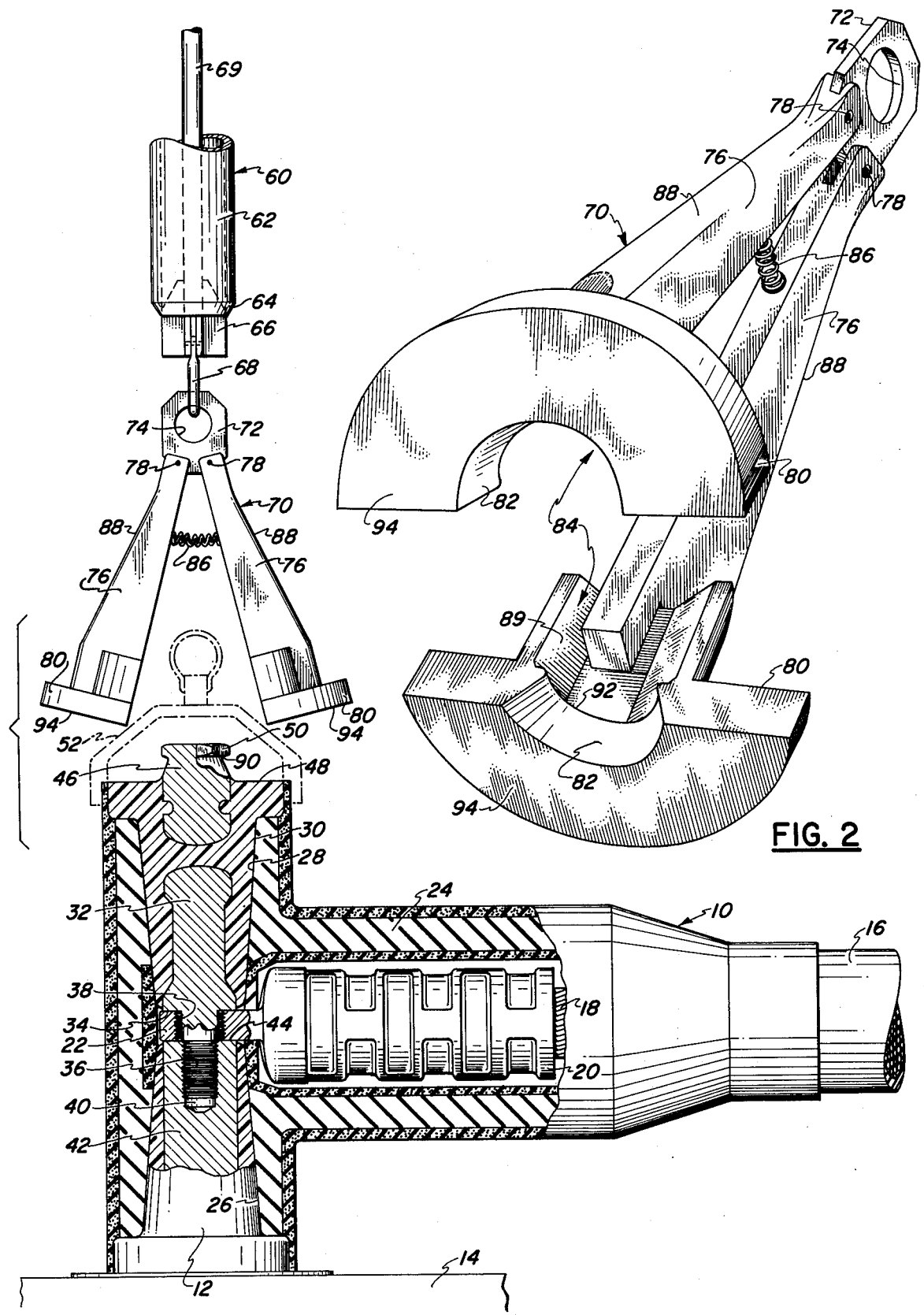
FIG. 1 is an elevational view, partially broken away, of a junction in a high voltage power distribution system wherein an electrical connector is connected to the terminal of an electrical apparatus and is about to be grounded and disconnected with apparatus constructed in accordance with the invention.
FIG. 2 is an enlarged perspective view of a portion of the apparatus of the invention.

Referring now to the drawing, and especially to FIG. 1 thereof, an electrical connector in the form of an elbow receptacle 10 is shown connected to the terminal 12 of an electrical apparatus, which in this instance is a high voltage power distribution transformer 14. The receptacle 10 is affixed to the terminus of a high voltage cable 16 having a central conductor 18 to which there is attached, as by crimping, an electrical contact 20 having an integral lug 22.

A composite housing 24 surrounds the contact 20 and provides an axially extending receptacle recess 26 within which the terminal 12 is received. A second axially extending recess 28, opposite to first recess 26, receives a plug 30 of insulating material, which plug 30 carries an insert 32 of conductive metal having a lateral annular clamping face 34 and a threaded stud 36 projecting axially from the clamping face 34. The stud 36 passes through an aperture 38 in the lug 22 and engages a threaded hole 40 in the conductor 42 of the terminal 12, conductor 42 also having a clamping face 44.

Plug 30 is received within recess 28 and is seated therein by engaging the stud 36 with hole 40 and rotating plug 30 within recess 28 until lug 22 is clamped between the opposed clamping faces 34 and 44, thereby effecting an electrical connection between the conductor 18 of cable 16 and conductor 42 of terminal 12 and establishing a junction between the circuit elements which include the contact 20 and conductor 42. Rotation of the plug 30 to effect the connection is accomplished by engagement of the appropriate tool with a coupling head illustrated in the form of top member 46 which is embedded in the plug 30 and projects axially upwardly from the top 48 of the plug 30. Top member 46 has a rotational coupling first portion in the form of a wrenching configuration having a standard hexagonal wrenching surface 50 which enables the top member 46 to be engaged by a wrench and turned to effect turning of plug 30 and stud 36. The top member 46 also serves as a test point for determining whether or not the circuit, which is comprised of conductors 18 and 42 and contact 20, is energized. Ordinarily a cap 52 (illustrated in phantom) is fitted over the housing 24 at the top of the plug 30 to enclose and protect the top 48 of the plug 30 and the top member 46.

When it is desired to disconnect the elbow receptacle 10 from the terminal 12, the circuit is de-energized, the conductor 18 of cable 16 is connected to ground and then the disconnection is accomplished. For reasons of safety, all manipulations of the receptacle, and any component parts thereof, are accomplished from a remote location by utilizing an insulated tool, here shown in the form of a hot-stick 60. Hot-sticks are in common use by personnel who work with electrical power distribution systems. Hot-stick 60 includes an elongate tubular member 62 having a slotted end member 64 with which there is received a slide member 66. A hook 68 is carried by the slide member 66 and can be opened or closed by advancing or retracting, respectively, the slide member 66 relative to the tubular member 62 and the end member 64. A rod 69 is affixed to the slide member 66 and may either be pushed downwardly or drawn upwardly, as viewed in FIG. 1, relative to tubular member 62 to operate the slide member 66 and the hook 68.

Figure 3:
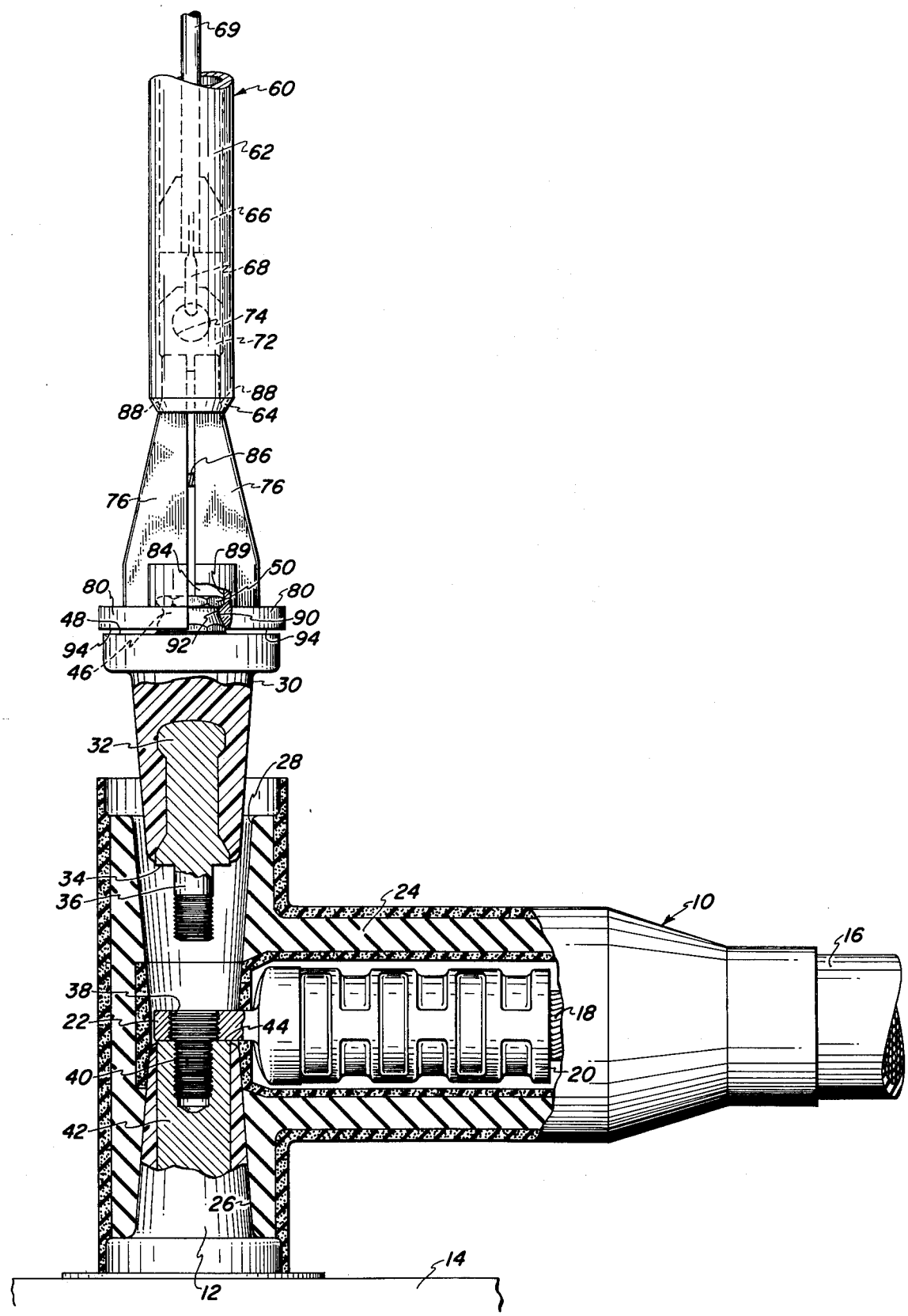
FIG. 3 is an elevational view similar to FIG. 1, but at a later stage of the operation.

After removal of the cap 52 and testing to determine if the connection is energized, in a now well-known manner, the plug 30 is removed utilizing apparatus constructed in accordance with the invention, as follows. As best seen in FIGS. 2 and 3, as well as in FIG. 1, the apparatus includes a coupling device for coupling the hot-stick 60 to the plug 30, the coupling device being in the form of a top member tool 70 having a coupling member shown as a plate 72 with a hook-eye 74 for receiving the hook 68 of the hot-stick 60. A pair of depending arms 76 are each mounted at one end thereof upon the plate 72 by means of pins 78 which enable each arm 76 to pivot relative to the plate 72 about the longitudinal axis of a pin 78. Each arm 76 carries a base plate 80 which includes a portion 82 of a socket 84 at the other end thereof. The pins 78 enable the arms 76 to pivot about parallel transverse axes between a first position, wherein the arms 78 and base plates 80 are spread apart, and the socket 84 is open, as illustrated in FIGS. 1 and 2, and a second position wherein the arms 78 and base plates 80 are brought together and the socket portions 82 are juxtaposed to close the socket 84, as illustrated in FIG. 3. A helical spring 86 resiliently biases the arms 78 to the first position.

Tool 70 is placed upon the hot-stick 60 by passing hook 68 through hook-eye 74, as seen in FIG. 1, and is then lowered over top member 46. Upon retraction of the hook assembly, which includes slide member 66 and hook 68, plate 72 will be drawn into the slotted end member 64, together with the upper ends of arms 76. In response to continued retraction of the hook assembly, camming means in the form of cam surfaces 88, which extend along the outer edges of the arms 76, will engage the slotted member 64 of the hot-stick 60 and the arms 76 will be urged toward one another and into the second position thereof, against the bias force of spring 86. In this manner the socket 84, which has a first portion in the form of cavity 89 having a wrenching configuration complementary to wrenching surface 50 of the top member 46, will close around top member 46, as seen in FIG. 3. Rotation of the hot-stick 60 about its longitudinal axis will rotate the tool 70 and, consequently, the top member 46 and the plug 30. Continued rotation will release the stud 36 from hole 40 and enable removal of the plug 30 from receptacle 10.

In order to enable lifting of the plug 30 from the receptacle 10, as seen in FIG. 3, the top member 46 is provided with a longitudinal translational coupling second portion in the form of an annular recess 90 extending laterally into the top member 46 and the socket 84 includes a second portion in the form of a generally annular complementary lip 92 which is seated in the recess 90 to provide the desired axial coupling for upward longitudinal translation of the plug 30 in response to upward movement of the hot-stick 60. The base plates 80 extend laterally and provide radial basal surfaces 94 generally complementary to the top 48 of plug 30 so that the plug 30 and tool 70 are coupled together without excessive rocking of one relative to the other.

Figures 4, 6:
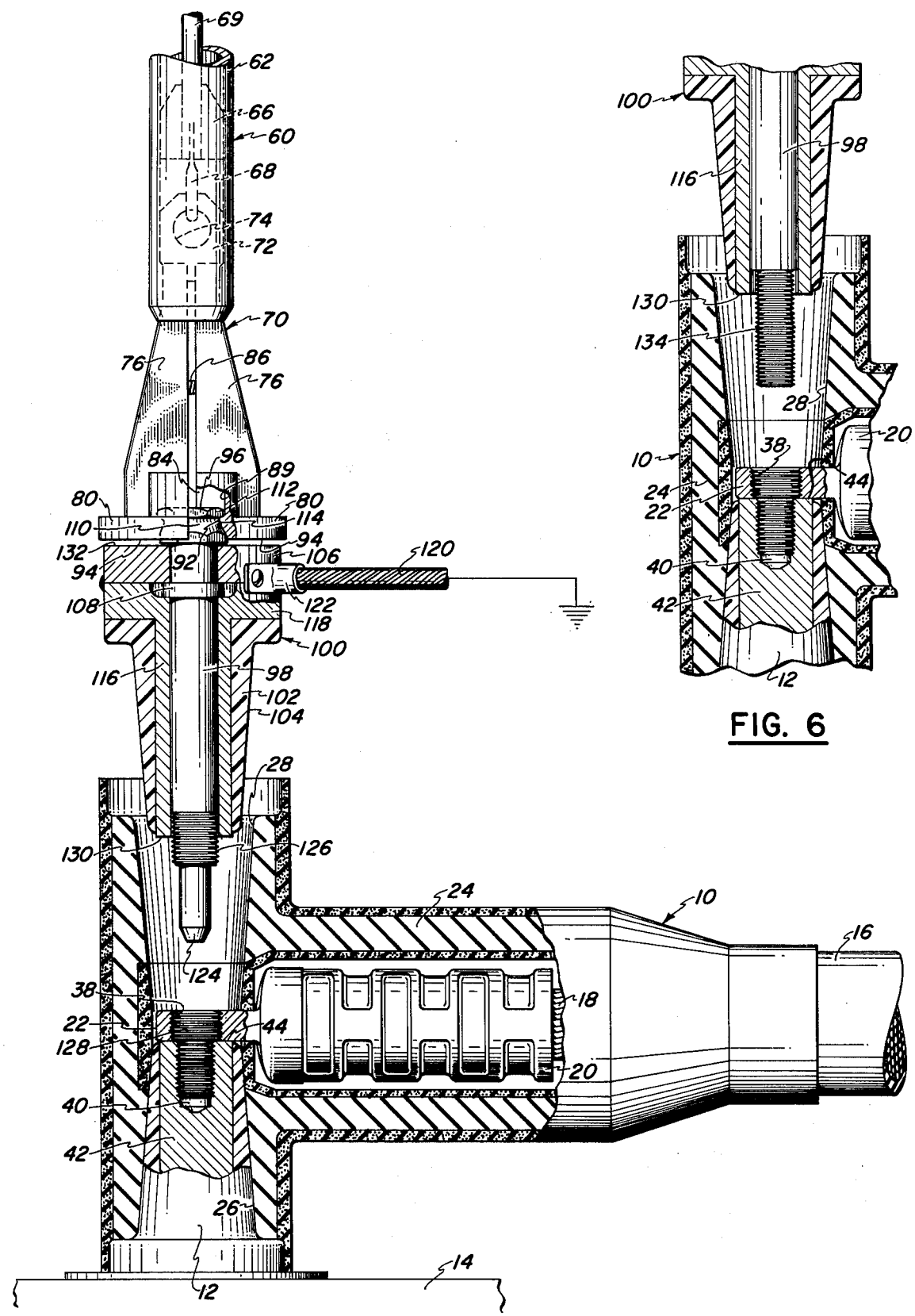
FIG. 4 is an elevational view similar to FIG. 1, but at a still later stage of the operation.
FIG. 6 is a fragmented elevational view similar to FIG. 4, but illustrating another embodiment of the invention.
Figure 5:
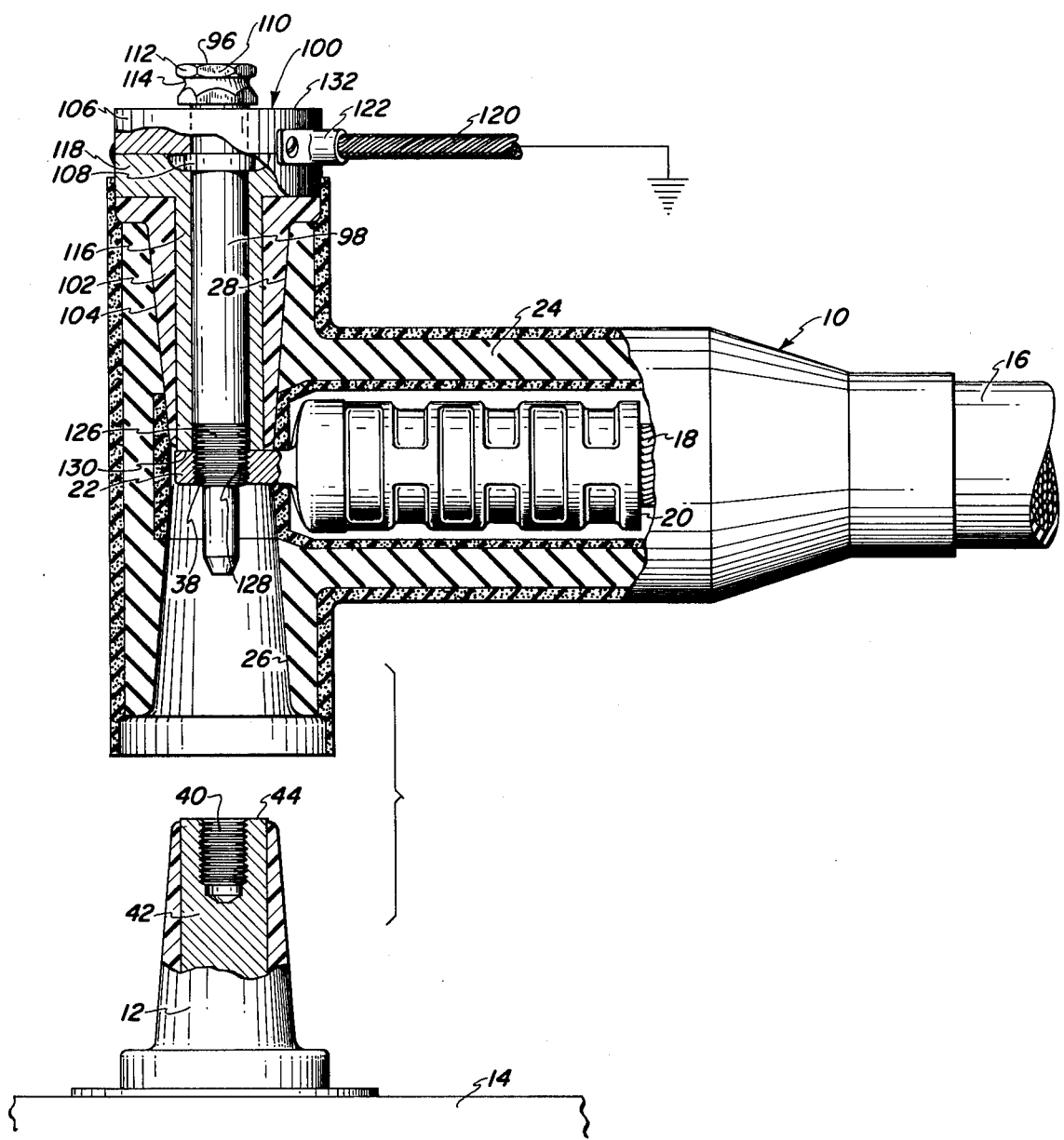
FIG. 5 is an elevational view similar to FIG. 1, but with the electrical connector grounded and disconnected.

Referring now to FIGS. 4 and 5, the conductor 18 of cable 16 is grounded, utilizing apparatus constructed in accordance with the invention, as follows. The plug 30 is released from the top member tool 70 by merely reversing the earlier described procedure to enable the arms 76 to return to the first position thereof, in response to the biasing force of spring 86, thereby opening socket 84 and releasing the top member 46. Socket 84 is then closed around one end 96 of a shaft 98 of a grounding tool 100 constructed in accordance with the invention.

Grounding tool 100 has an overall configuration similar to plug 30 insofar as tool 100 has a housing 102 with an external surface configuration 104 which is complementary to second recess 28 so as to enable the tool 100 to be received within recess 28. Shaft 98 is journaled for rotation within a collar 106 and is captured within the collar 106 by a retaining shoulder 108 and a coupling head 110 at the end 96 of the shaft 98. The coupling head 110 serves as rotation means for effecting rotation of the shaft 98 and has an external configuration which includes a first portion with a wrenching surface 112 and a second portion including a laterally extending annular recess 114, both complementary, respectively, to the wrenching configuration of cavity 89 and lip 92 of socket 84 of tool 70.

Shaft 98 extends longitudinally through a sleeve 116, which, in this instance, includes an integral flange 118 affixed to the collar 106, the shaft 98, collar 106 and sleeve 116 all being constructed of a metal having good electrical conductivity. A ground conductor 120 is affixed and electrically connected to the collar 106 and flange 118 of sleeve 116 by means of a terminal 122.

Upon lowering the hot-stick 60, the grounding tool 100 is lowered into recess 28 and a projection 124, which extends longitudinally from the lower end of shaft 98, will serve as a pilot to align engaging means, shown in the form of a thread 126, on shaft 98 with aperture 38 in lug 22 of contact 20. Rotation of the hot-stick 60 and tool 70 will then rotate shaft 98 to engage the thread 126 with a complementary thread 128 in aperture 38, thereby grounding the conductor 18 of cable 16. Continued rotation of the hot-stick 60 and shaft 98 will bring a clamping surface 130, whichh is located at the lower terminal end of sleeve 116, into clamping engagement with the lug 22 around the aperture 38 for a fully effective ground connection. At the same time, longitudinal advancement of the projection 124 into hole 40 in conductor 42 of the terminal 12 will bottom the projection 124 in the hole 40 and will raise the lug 22 from the conductor 42 of the terminal 12, thereby exerting an upward force upon the receptacle 10 itself to effect release of the housing 24 from the terminal 12. It is noted that since shaft 98 is journaled for rotation relative to housing 102, it is not necessary to rotate housing 102 in recess 28 during either installation or removal of grounding tool 100.

The coupling between tool 70 and head 110 enables the entire assembly of grounding tool 100 and receptacle 10 to be lifted by an upward pull on the hot-stick 60, thereby effecting complete disconnection of the receptacle 10 from terminal 12, as seen in FIG. 5. The receptacle 10 may then be placed at rest upon a dummy terminal (not shown) or the like and tool 70 released from head 110 by advancement of the slide member 66 and hook 68 to enable spreading of the arms 76 and opening of the socket 84. Controlled manipulation of the receptacle 10 by movement of the hot-stick 60 is facilitated by the positive coupling provided by basal surfaces 94 of coupling tool 70 which extend radially outwardly to cooperate with extended radial surface 132 of the collar 106 of the grounding tool 100 to establish complementary bearing surfaces which maintain the desired alignment of grounding tool 100 and receptacle 10 with hot-stick 60. The fact that the cable 16 is grounded is evident from visual inspection which reveals the ground conductor 120 attached to the collar 106 and flange 118.

Reconnection of the receptacle 10 and terminal 12 can be accomplished with a hot-stick 60 and a tool 70 by merely reversing the procedure outlined for disconnection. Thus, both connection and disconnection are accomplished with ease and with the inherent safety of locating the operator at a remote position, away from the connection itself.

Where it is desired merely to ground the conductor 18, through lug 22 of contact 20, as well as conductor 42 of terminal 12, without removal of the receptacle 10 from the terminal 12, the lower terminal end of shaft 98 may be provided with an alternative configuration, as illustrated in FIG. 6. Here, shaft 98 is provided with a thread 134 which is complementary to the thread of threaded hole 40 so that rotation of shaft 98 by rotation of hot-stick 60 will engage thread 134 with hole 40 and advance the grounding tool until clamping surface 130 engages lug 22. In this manner, the circuit elements at the junction, which include the contact 20 and the conductor 42, as well as the circuit which includes terminal 12 and cable 16 is visibly grounded for maintenance purposes, without removal of receptacle 10 from the terminal.

The above detailed description of preferred embodiments of the invention is provided by way of example only. Various details of design and construction may be modified without departing from the true spirit and scope of the invention as set forth in the appended claims.

We claim:

1. Apparatus for enabling manipulation of a high voltage electrical connector from a remote location by the use of an insulated tool, such as a hot-stick, to effect connection and disconnection of the connector and the terminal of an electrical apparatus, the connector having a contact affixed to the conductor of a high voltage cable for electrically connecting the conductor to the terminal, said apparatus comprising:
   a housing;
   a longitudinally extending shaft journaled for rotation in the housing, said shaft having opposite ends;
   engaging means at one end of the shaft for engaging the shaft with the contact of the connector in response to rotation of the shaft;
   conductive grounding means;
   means in the housing for electrically connecting the grounding means to the contact when the shaft is engaged with the contact; and
   rotation means at the opposite end of the shaft for coupling the shaft for rotation with the insulated tool.

2. The invention of claim 1 wherein the engaging means include a thread on the shaft for engaging a complementary threaded aperture in the contact.

3. The invention of claim 2 wherein the shaft includes a projection extending beyond the thread at the one end of the shaft for engaging the terminal as the thread is engaged with the threaded aperture to move the contact relative to the terminal in response to rotation of the shaft and advancement of the projection beyond the threaded aperture.

4. The invention of claim 2 wherein the housing includes a collar and the shaft is journaled for rotation within the collar.

5. The invention of claim 4 wherein:
   the grounding means include a sleeve extending between the collar and the one end of the shaft;
   the shaft passes through the sleeve; and
   the sleeve terminates at the thread and includes a clamping face for engaging the contact of the connector around the threaded aperture therein, said sleeve being electrically conductive.

6. The invention of claim 5 including a grounding conductor electrically connected to the sleeve.

7. The invention of claim 5 wherein the shaft and the collar are electrically conductive and the grounding means include a grounding conductor affixed to the collar.

8. The invention of claim 4 wherein the shaft and the collar are electrically conductive and the grounding means include:
   a sleeve extending between the collar and the one end of the shaft, said sleeve being assembled with the collar;
   the shaft passes through the sleeve, and the sleeve terminates at the thread and includes a clamping face for engaging the contact around the threaded aperture therein, said sleeve being electrically conductive; and a grounding conductor electrically connected to the assembled sleeve and collar.

9. The invention of claim 1 wherein the rotation means include a coupling head on the shaft, said head having a rotational coupling first portion and a longitudinal translational coupling second portion.

10. The invention of claim 9 wherein the first portion of the coupling head includes a wrenching configuration and the second portion of the coupling head includes a laterally extending recess adjacent the wrenching configuration.

11. The invention of claim 10 wherein the insulated tool is a hot-stick having a hook which is selectively retractable into the hot-stick and the rotation means include:
   a coupling member including a hook-eye for receiving the hot-stick hook;
   a pair of arms mounted on the coupling member, each arm carrying a portion of a socket having a configuration complementary to the first and second portions of the coupling head on the shaft, the arms being mounted for movement between a first position wherein the arms are spaced apart laterally from one another and the socket is open, and a second position wherein the arms are juxtaposed with one another and the socket is closed;
   means resiliently biasing the arms toward the first position;
   camming means on the arms for contacting the hot-stick, upon retraction of the hook and coupling member, to move the arms to the second position for capturing the coupling head within the socket.

12. The invention of claim 11 wherein the arms are mounted upon the coupling member for pivotal movement between said first and second positions.

13. The invention of claim 12 wherein the arms are mounted for pivotal movement about parallel transverse axes, each located one adjacent one end of an arm, and the socket portions are located adjacent the other end of each arm.

14. The invention of claim 13 wherein the socket includes:
   a first portion having a wrenching configuration complementary to the wrenching configuration of the coupling head; and
   a second portion including a lip complementary to the recess of the coupling head such that upon movement of the arms to the second longitudinally in response to rotation or longitudinal movement of the coupling member.

15. Apparatus for enabling manipulation of a high voltage electrical connector from a remote location by the use of an insulated tool, such as a hot-stick, to effect connection and disconnection of the connector and the terminal of an electrical apparatus, the insulated tool having a hook which is selectively retractable into the insulated tool and the connector having a coupling head with a rotational coupling first portion and a longitudinal translational coupling second portion, wherein said first portion of said coupling head includes a wrenching configuration and said second portion of said coupling head includes a laterally extending recess adjacent the wrenching configuration said apparatus comprising:
   a coupling member including a hook-eye for receiving the insulated tool hook;
   a pair of arms each mounted on the coupling member, each arm carrying a portion of a socket having a configuration complementary to the first and second portions of the coupling head, the arms being mounted for movement between a first position wherein th arms are spaced apart laterally from one another and the socket is open, and a second position wherein the arms are juxtaposed with one another and the socket is closed;
   means resiliently biasing the arms toward the first position;
   camming means on the arms for contacting the insulated tool upon retraction of the hook and coupling member to move the arms to the second position for capturing the coupling head within the socket, said socket including first and second portions complementary, respectively, to the first and second portions of the coupling head such that upon movement of the arms to the second position, the coupling head selectively may be rotated or moved longitudinally in response to rotation or longitudinal translation of the coupling member, said socket first complementary portion including a cavity with a wrenching configuration and said socket second complementary portion including a laterally extending lip.

16. The invention of claim 15 wherein the arms are mounted upon the coupling member for pivotal movement between said first and second positions.

17. The invention of claim 16 wherein the arms are mounted for pivotal movement about parallel transverse axes, each located one adjacent one end of an arm, and the socket portions are located adjacent the other end of each arm.

18. Apparatus for enabling grounding of a high voltage distribution circuit, through circuit elements located at the junction of an electrical connector and the terminal of an electrical apparatus, from a remote location by the use of an insulated tool, such as a hot-stick, the circuit elements including a contact in the connector affixed to the central conductor of a high voltage cable, and a conductor in the terminal, the contact connecting the central conductor to the conductor of the terminal, said apparatus comprising:
   a housing;
   a longitudinally extending shaft journaled for rotation in the housing, said shaft having opposite ends;
   engaging means at one end of the shaft for engaging a circuit element in response to rotation of the shaft;
   conductive grounding means;
   means in the housing for electrically connecting the grounding means to the circuit element when the shaft is engaged with said circuit element; and
   rotation means at the opposite end of the shaft for coupling the shaft for rotation with the insulated tool.

19. The invention of claim 18 wherein the engaging means include a thread on the shaft for engaging a complementary threaded hole in the conductor of the terminal.

20. The invention of claim 19 wherein:
   the grounding means include a sleeve extending between the collar and the one end of the shaft;
   the shaft passes through the sleeve; and
   the sleeve terminates at the thread and includes a clamping face for engaging the contact of the connector around the threaded aperture therein, said sleeve being electrically conductive.

21. The invention of claim 20 including a grounding conductor electrically connected to the sleeve.

22. The invention of claim 20 wherein the shaft and the collar are electrically conductive and the grounding means includes a grounding conductor affixed to the collar.

23. The invention of claim 19 wherein the shaft and the collar are electrically conductive and the grounding means include:

a sleeve extending between the collar and the one end of the shaft, said sleeve being assembled with the collar;

the shaft passes through the sleeve, and the sleeve terminates at the thread and includes a clamping face for engaging the contact around the threaded aperture therein, said sleeve being electrically conductive; and a grounding conductor electrically connected to the assembled sleeve and collar.

24. The invention of claim 19 wherein the housing includes a collar and the shaft is journaled for rotation within the collar.

* * * * *